(12) United States Patent
Ahn et al.

(10) Patent No.: US 8,283,430 B2
(45) Date of Patent: Oct. 9, 2012

(54) COMPOSITION FOR MANUFACTURING A CARBOXYLIC GROUP-CONTAINING POLYMER AND A POLYMER MANUFACTURED BY USING THE SAME

(75) Inventors: Kyo-Duck Ahn, Daejeon (KR); Jong-Gi Lee, Daejeon (KR); Choun-San Kim, Daejeon (KR); Young-Shin Kim, Daejeon (KR)

(73) Assignee: AK Chemtech Co. Ltd., Daejeon (KR)

( * ) Notice: Subject to any disclaimer, the term of this patent is extended or adjusted under 35 U.S.C. 154(b) by 515 days.

(21) Appl. No.: 12/525,589

(22) PCT Filed: Feb. 13, 2008

(86) PCT No.: PCT/KR2008/000842
§ 371 (c)(1),
(2), (4) Date: Aug. 3, 2009

(87) PCT Pub. No.: WO2008/100073
PCT Pub. Date: Aug. 21, 2008

(65) Prior Publication Data
US 2009/0318653 A1    Dec. 24, 2009

(30) Foreign Application Priority Data
Feb. 15, 2007 (KR) .......................... 10-2007-0015912

(51) Int. Cl.
*C08F 20/10* (2006.01)
*C08F 22/02* (2006.01)
*C08F 20/04* (2006.01)
*C08F 20/06* (2006.01)
*C08F 220/12* (2006.01)
*C08F 218/02* (2006.01)

(52) U.S. Cl. .................. 526/318; 526/318.2; 526/318.3; 526/318.5; 526/329.6; 526/333

(58) Field of Classification Search ................ 526/318.3, 526/318.5, 258, 260, 313, 317.1, 318.2, 318, 526/41, 329.6, 333
See application file for complete search history.

(56) References Cited

U.S. PATENT DOCUMENTS

| | | | | |
|---|---|---|---|---|
| 2,798,053 A | * | 7/1957 | Brown | ............................. 521/38 |
| 2,923,692 A | | 2/1960 | Ackerman et al. | |
| 2,958,679 A | | 11/1960 | Jones | |
| 3,426,004 A | | 2/1969 | Wagner | |
| 4,267,103 A | | 5/1981 | Cohen | |
| 4,814,514 A | * | 3/1989 | Yokota et al. | ................. 568/608 |
| 4,923,940 A | | 5/1990 | Hsu | |
| 5,086,142 A | * | 2/1992 | Fock et al. | ..................... 526/318 |
| 5,288,814 A | * | 2/1994 | Long et al. | ..................... 525/450 |
| 6,841,655 B1 | | 1/2005 | Gota et al. | |
| 6,869,994 B1 | | 3/2005 | Fujikake et al. | |

FOREIGN PATENT DOCUMENTS

| | | |
|---|---|---|
| JP | 58-084819 A | 5/1983 |
| JP | 2000-355614 A | 12/2000 |

OTHER PUBLICATIONS

International Search Report published Mar. 26, 2009 for PCT/KR2008/000842 filed Feb. 13, 2008.
Written Opinion of the International Searching Authority mailed Jan. 29, 2009 for PCT/KR2008/000842 filed Feb. 13, 2008.
International Preliminary Examination Report mailed May 11, 2009 for PCT/KR2008/000842 filed Feb. 13, 2009.

* cited by examiner

*Primary Examiner* — Ling Choi
*Assistant Examiner* — Monique Peets
(74) *Attorney, Agent, or Firm* — Martin Fleit; Paul D. Bianco; Fleit Gibbons Gutman Bongini & Bianco PL

(57) ABSTRACT

The present invention relates to a composition for manufacturing a carboxylic group-containing polymer and a carboxylic group-containing polymer manufactured by using the same. More particularly, the present invention relates to a composition for manufacturing a carboxylic group-containing polymer comprising an allyl monomer having a long chain of a hydrophilic part containing alkylene oxide and a side chain of a hydrophobic part containing fatty acid ester as a dispersion promoter; a vinyl group-containing unsaturated carboxylic acid; a vinyl group-containing crosslinking agent; and a radical polymerization initiator, and a carboxylic group-containing polymer manufactured by using the same wherein the polymer can be dispersed in water without stirring, its dispersion solution has low viscosity, and its neutralized viscous solution obtained by alkali neutralization has high viscosity and transparency. Therefore, the carboxylic group-containing polymer of the present invention can be effectively used in the fields of a thickener and a dispersion stabilizer for an emulsion, a suspension and the like.

9 Claims, No Drawings

COMPOSITION FOR MANUFACTURING A CARBOXYLIC GROUP-CONTAINING POLYMER AND A POLYMER MANUFACTURED BY USING THE SAME

TECHNICAL FIELD

The present invention relates to a composition for manufacturing a carboxylic group-containing polymer comprising an allyl monomer having a long chain of a hydrophilic part containing alkylene oxide and a side chain of a hydrophobic part containing fatty acid ester as a dispersion promoter; a vinyl group-containing unsaturated carboxylic acid; a vinyl group-containing crosslinking agent; and a radical polymerization initiator, and a carboxylic group-containing polymer manufactured by using the same wherein the polymer can be dispersed in water without stirring, its dispersion solution has low viscosity, and its neutralized viscous solution obtained by alkali neutralization has high viscosity and transparency. Therefore, the carboxylic group-containing polymer of the present invention can be effectively used in the fields of a thickener and a dispersion stabilizer for an emulsion, a suspension and the like.

BACKGROUND ART

Cross-linked carboxylic group-containing polymers have been conventionally used as thickeners for various aqueous solutions. As these cross-linked carboxylic group-containing polymers, there have been known, for instance, a copolymer of an α,β-unsaturated carboxylic acid such as acrylic acid with a polyallyl ether (U.S. Pat. No. 2,798,053, U.S. Pat. No. 2,923,692, U.S. Pat. No. 4,267,103, U.S. Pat. No. 4,923,940); a copolymer of an α,β-unsaturated carboxylic acid with hexaallyl trimethylene trisulfone (U.S. Pat. No. 2,958,679); a copolymer of an α,β-unsaturated carboxylic acid with triallyl phosphate (U.S. Pat. No. 3,426,004); a copolymer of an α,β-unsaturated carboxylic acid with glycidyl methacrylate (Japanese Patent Laid-open No. Sho 58-84819) and the like.

DISCLOSURE

Technical Problem

These cross-linked carboxylic group-containing polymers have been used for applications such as thickeners and suspension stabilizers for emulsions and suspensions by dissolving the polymer in water and neutralizing the solution with an alkali to give a neutralized viscous solution. In order to use the above mentioned cross-linked carboxylic group-containing polymer for these applications, it is necessary to prepare a homogeneous aqueous solution of the polymer. However, when the cross-linked carboxylic group-containing polymer is dissolved in water, it usually generates undissolved powder lumps, and once the undissolved powder lumps are generated, a gel-like layer is formed on its surface. Due to these phenomena, there are some defects such that the penetration rate of water into the internal of the polymer is delayed, thereby making it difficult to obtain a homogeneous solution.

Therefore, when the cross-linked carboxylic group-containing polymer is used, there is necessitated an inefficient operating procedure, for example, of gradually adding the cross-linked carboxylic group-containing polymer to water under high speed agitation, and in some cases, there is a disadvantage of requiring a specific dissolving device for preventing the generation of undissolved powder lumps.

In order to overcome these problems, U.S. Pat. No. 5,288,814 discloses a method for reducing the time of dispersing the carboxylic group-containing polymers under stirring by using a nonionic surfactant as a steric stabilizer, and Japanese Patent Laid-open No. 2000-355614 discloses a method for dispersing the polymers by adding polyhydric alcohol fatty acid ester and polyhydric alcohol fatty acid ester alkylene oxide adducts. The above methods can reduce the dispersion time, but have the problems in that the hydro-dispersible solution prepared by stirring-free dispersion according to the same shows high viscosity, and its neutralized viscous solution obtained by alkali neutralization exhibits low transparency.

Technical Solution

The present inventors have therefore endeavored to develop a method for manufacturing a carboxylic group-containing polymer which can be dispersed without stirring and exhibits excellent properties. As a result, the present inventors have found that when manufactured by polymerizing a composition comprising a certain amount of an allyl monomer containing a long chain of a hydrophilic part having alkylene oxide and a side chain of a hydrophobic having fatty acid ester as a dispersion promoter, the resulting polymer is endowed with a self-hydration ability enough to be dispersed in water without stirring, the viscosity of its dispersion solution is low, and the neutralized viscous solution obtained by neutralizing the dispersion solution with an alkali exhibits high viscosity and transparency.

Therefore, an object of the present invention is to provide a carboxylic group-containing polymer having excellent properties of stirring-free dispersion, low viscosity of a dispersion solution, and high viscosity and transparency of a neutralized viscous solution by polymerizing the composition comprising a side chain of a specific allyl monomer as a dispersion promoter.

Advantageous Effects

Mode for Invention

The present invention provides a composition for manufacturing a carboxylic group-containing polymer comprising a vinyl group-containing unsaturated carboxylic acid, a vinyl group-containing crosslinking agent and a radical polymerization initiator, which is characterized by containing 0.1 to 10 parts by weight of an allyl monomer represented by the following Formula 1 on the basis of 100 parts by weight of the vinyl group-containing unsaturated carboxylic acid:

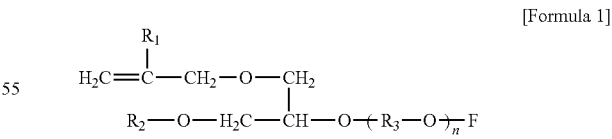

[Formula 1]

wherein $R_1$ is H or $CH_3$, $R_2$ is $C_{10}$~$C_{30}$ alkyl, $R_3$ is $C_1$~$C_6$ alkylene, F is H, $CH_3$, $SO_3H$, $SO_3Na$ or $SO_3NH_4$, and n is an integer ranging from 10 to 60.

Hereinafter, the present invention is described in more detail.

The present invention relates to a composition for manufacturing a carboxylic group-containing polymer which comprises a side chain of an allyl monomer represented by Formula 1 having a long chain of a hydrophilic part containing alkylene oxide and a hydrophobic part containing a fatty acid derivative as a dispersion promoter; a vinyl group-containing unsaturated carboxylic acid; a vinyl group-containing crosslinking agent; and a radical polymerization initiator, and a carboxylic group-containing polymer manufactured by using the same in wherein the polymer can be dispersed in water without stirring through a hydrogen bonding and a hydrophilic interaction between the hydrophilic part of the allyl monomer and the cross-linked polymer chains, its dispersion solution has low viscosity, and the neutralized viscous solution obtained by neutralizing the dispersion solution with an alkali has high viscosity and transparency.

In order to overcome the prior art problems of steric stabilizers and polyhydric alcohol fatty acid ester alkylene oxide adducts and provide self-hydration ability to the polymer, the hydrophilic part of the allyl monomer used as a dispersion promoting ingredient has to be long enough to stabilize chain aggregates in an inert solvent through a hydrogen bonding or a hydrophilic interaction with the polymer chains of the carboxylic group-containing hydro-dispersion polymer composition, and its hydrophobic part must be easily dispersed in an inert solvent and have a structure capable of inhibiting the formation of chain aggregates. Further, if a hydro-dispersion polymer containing an allyl group whose reaction rate is relatively lower than an acryl group is used in the polymerization, it is possible to polymerize the allyl group into the surface of the polymer at a high concentration, which makes increased the promoting effect of polymer dispersion when hydrolyzed in an aqueous solution.

Generally, the chains of the carboxylic group-containing polymer generated in the inert solvent become coiled in a high density while forming chain aggregates with the hydrophilic parts of the dispersion promoter, leading to form a polymer in a spherical shape wherein the hydrophobic parts of the dispersion promoter are displaced in the outer wall of the polymer. If such polymer brings into contact with water, the highly coiled chains of the polymer are disintegrated by forming a hydrogen bonding with water, thereby giving mobility to the allyl monomer. After that, a phase inversion where the hydrophobic parts of the allyl monomer move into the interior of the polymer and the hydrophilic parts thereof move out to the outside of the polymer is occurred, which makes possible self-hydration of the polymer. At this time, in the case that the hydrophilic parts of the aryl monomer are in the form of merely existing within the particle rather than participating into the reaction, similar to typical steric stabilizers or polyhydric alcohol fatty acid ester alkylene adducts well-known in the art, if their size is too small, the dispersion promoter may be leaked out from the polymer in the course of phase inversion, which results in decreasing self-hydration ability of the polymer, generating an excessive amount of bubbles, and lowering transparency of the neutralized viscous solution.

As the hydrophilic parts of the allyl monomer, alkylene oxides having 1 to 6 carbon atoms, in particular, (poly)methylene oxide, (poly)ethylene oxide and the like may be used. It is preferable to use (poly)ethylene oxide, and the allyl monomer contains 10 to 60 moles of the alkylene oxide. Since if the content of alkylene oxide is less than 10 moles, the chain aggregation between the chains of the carboxylic group-containing polymer and the alkylene oxide of the dispersion promoter during the polymerization is not completely conducted, the dispersion promoters not being held in the polymer are absorbed to the surface of the polymer via a hydrogen bonding and not the chain aggregation with the polymer. Due to this phenomenon, when the carboxylic group-containing hydro-dispersion polymers are dispersed in an aqueous solution, the dispersion promoters become detached from the polymers and slip out into the aqueous solution. Further, the dispersion promoters which are participated into the chain aggregation with the carboxylic group-containing polymers become separated from the polymers during the phase conversion in an aqueous solution, thereby decreasing self-hydration ability of the polymer, generating an excessive amount of bubbles, and lowering transparency of its neutralized viscous solution. In addition, in case of containing more than 60 moles of alkylene oxide, the chain aggregation between the cross-linked polymer chains of the carboxylic group-containing polymer and the alkylene oxide can be easily generated during the polymerization, but the chain aggregation between the alkylene oxides is also occurred. Due to the latter chain aggregation, lumps of the alkylene oxide aggregates are locally generated within the carboxylic group-containing polymer. When the carboxylic group-containing polymers are dispersed in an aqueous solution, thus generated lumps locally prevent the induction of phase conversion, leading to the decrease in self-hydration ability of the polymer.

The hydrophobic parts of the allyl monomer contain fatty acid ester as a fatty acid derivative, wherein the fatty acid may be selected from the group consisting of stearic acid, isostearic acid, linoleic ester and oleic acid and can be used alone or in a mixture of at least two kinds.

The allyl monomer may be used in the amount ranging from 0.1 to 10 parts by weight on the basis of 100 parts by weight of the unsaturated carboxylic acid. If the amount is not more than 0.1 parts by weight, it is too small to exert its dispersion promoting ability, while if the amount is exceeding to 10 parts by weight, there is an advantage of reducing the time of self-hydration, but its viscous solution's transparency and viscosity are drastically decreased.

The vinyl group-containing unsaturated carboxylic acid included in the carboxylic group-containing polymer is not limited to specified ones as long as it can be commonly used in the art, and includes, for example, unsaturated carboxylic acids having at least one vinyl group represented by the following Formula 2.

[Formula 2]

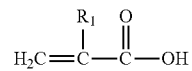

wherein, $R_1$ is hydrogen, halogen, cyanogen (—C≡N) or alkyl, which is exemplified by acrylic acid, methacrylic acid, itaconic acid, fumaric acid, crotonic acid, maleic acid, olefin-based unsaturated carboxylic acid and the like. The unsaturated carboxylic acid may be used alone or in a mixture of at least two kinds, and it is preferable to use acrylic acid in terms of price, performance, the condition of demand and supply and the performance of polymers.

The vinyl group-containing crosslinking agent is a multifunctional compound having at least two vinyl groups, and can be dissolved even in the inert solvent used as a solvent in the present invention. Concrete examples of the vinyl group-containing crosslinking agent may include methylene bisacryl amide, pentaerythritol diallyl ether, pentaerythritol triallyl ether, pentaerythritol tetraallyl ether, pentaerythritol diacrylate, pentaerythritol triacrylate, ethylene glycol dimethacrylate, ethylene glycol diglycidylether, tetra vinyl silane and poly allyl sucrose, and they can be used alone or in a mixture of at least two kinds. It is preferable to use a pentaerythritol derivative.

The vinyl group-containing crosslinking agents may be used in the amount ranging from 0.1 to 2.0 parts by weight on the basis of 100 parts by weight of an unsaturated carboxylic acid. While if the amount is less than 0.1 parts by weight, its viscosity is too low when neutralized with an alkali, leading to a lowering of dispersion stability, if the amount is more than 2.0 parts by weight, an insoluble gel is formed when neutralized with an alkali.

The radical polymerization initiators used in the present invention are not limited to specified ones as long as it can be commonly used in the art as a lipophilic initiator, and include, for instance, azo initiators or peroxide initiators which can be used alone or in a mixture of at least two kinds. Representative examples of the azo initiators include 2,2'-azobisisobutyronitrile, 2-2'-azobis-2-methylbutyronitrile, 2,2'-azobis-4-methoxy-2,4-dimethylvaleronitrile, 2,2'-azobis-2,4-dimethylvaleronitrile, dimethyl 2,2'-azobis-2-methyl propionate and the like, and those of the peroxide initiators include t-butyl peroxide, butylhydro peroxide, cumene peroxide, benzoyl peroxide and the like.

It is desired that the amount of the radical polymerization initiator is in the range from 0.1 to 2.0 parts by weight on the basis of 100 parts by weight of the unsaturated carboxylic acid. If the amount is less than 0.1 parts by weight, the rate of polymerization reaction is too slow, leading to a lowering of economical efficiency of the polymerization, while if the amount is more than 2.0 parts by weight, the rate of polymerization reaction is too fast, and thereby, it is difficult to remove the heat of polymerization, which results in a drastic decline of polymerization stability.

Meanwhile, the present invention manufactures a carboxylic group-containing polymer in a white powder form by preparing a composition for manufacturing a carboxylic group-containing polymer under nitrogen atmosphere, wherein the composition comprises 1) a vinyl group-containing unsaturated carboxylic acid, 2) a vinyl group-containing crosslinking agent, 3) a radical polymerization initiator, and 4) an allyl monomer represented by the above-mentioned Formula 1 as a dispersion promoter; and performing a precipitation polymerization process at a temperature ranging from 50 to 80° C. at a stirring rate ranging from 50 to 150 rpm.

The inert solvent can dissolve each ingredient used in the present invention, but cannot dissolve the polymer manufactured according to the present invention. The inert solvent suitable for the present invention may include aromatic hydrocarbons, halogen-substituted hydrocarbons, aliphatic hydrocarbons, alicyclic hydrocarbons and ester compounds, and they can be used alone or in a mixture of at least two kinds. When used in a mixture, it is preferable to use an azeotropic mixture where the substances being mixed have an azeotropic point to each other. Representative examples of the inert solvent may include benzene, toluene and xylene as an aromatic hydrocarbon; dichloroethane and chloroform as a halogen substituted hydrocarbon; n-pentane, n-hexane, n-heptane and n-octane as an aliphatic hydrocarbon; cyclopentane, methylcyclopentane, cyclohexane and methylcyclohexane as an alicyclic hydrocarbon; and methyl acetate, ethyl acetate, isopropyl acetate, butyl acetate and propyl acetate as an ester compound.

It is desired that the amount of the inert solvent is in the range from 400 to 1,000 parts by weight on the basis of the total amount of the composition. If the amount is not more than 400 parts by weight, it is difficult to control the heat of polymerization, while if the amount is exceeding to 1,000 parts by weight, it is economically unfavorable due to its low production yield per unit.

The precipitation polymerization process is not limited to specified ones as long as it can be normally used in the art. At this time, if the stirring rate is slower than 50 rpm, the particle aggregation is induced during the polymerization, and thereby, there is a problem in that the center of the particle is not dissolved when hydrolyzed by water. If the stirring rate is faster than 150 rpm, the solvent is excessively volatilized, which is economically unfavorable. Further, in case of performing the reaction at a temperature lower than 50° C., the excessive amount of the allyl monomer is remained after the polymerization, while in case of performing the reaction at a temperature higher than 80° C., since that temperature is beyond the boiling point of the solvent, there is incurred a heavy loss of the solvent, which is also economically unfavorable.

The carboxylic group-containing polymer manufactured according to the method of the present invention has the following properties: its self-hydration time (at 0.5 wt % of polymer) is within 10 min, particularly 5 to 10 min, the dispersion viscosity (at 2.5 wt % of polymer) is less than 800 cps, particularly in the range from 400 to 800 cps, the neutralized viscosity (at pH 6.5 to 7.5) is in the range of 30,000 to 100,000 cps, the transparency is 85% or more, particularly in the range from 85 to 99.9%.

Since the carboxyl group-containing hydro-dispersion polymer according to the present invention exhibits the above described properties, it can be effectively used to achieve various purposes such as a thickener for improving viscosity, an emulsifier which makes two kinds of incompatible liquids into a stable emulsion, and a dispersion stabilizer. These thickener, emulsifier and dispersion stabilizer are typically used in the art and can be applied to various industrial fields, for instance, such as cosmetics, personal hygiene products, medical products, agricultural products, industrial products and the like.

Hereinafter, the present invention will be explained in further detail on the basis of the following Examples, without intending to limit the present invention thereto.

EXAMPLE

Carboxylic Group-Containing Polymer

The following Table 1 shows the kinds of an allyl monomer used in the manufacture of carboxylic group-containing polymers according to Examples 1 to 9.

TABLE 1

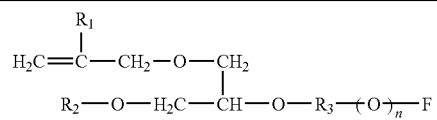

| allyl monomer | n | $R_1$ | $R_2$ | $R_3$ | F |
|---|---|---|---|---|---|
| A | 10 | H | $C_{12}$ alkyl | $C_2H_4$ | H |
| B | 20 | H | $C_{12}$ alkyl | $C_2H_4$ | H |
| C | 40 | H | $C_{12}$ alkyl | $C_2H_4$ | H |
| D | 10 | H | $C_{12}$ alkyl | $C_2H_4$ | $SO_3Na$ |
| E | 20 | H | $C_{12}$ alkyl | $C_2H_4$ | $SO_3Na$ |
| F | 40 | H | $C_{12}$ alkyl | $C_2H_4$ | $SO_3Na$ |
| G | 40 | H | $C_{14}$ alkyl | $C_2H_4$ | $SO_3Na$ |
| H | 40 | H | $C_{16}$ alkyl | $C_2H_4$ | $SO_3Na$ |
| I | 40 | H | $C_{18}$ alkyl | $C_2H_4$ | $SO_3Na$ |

Example 1

In order to manufacture carboxylic group-containing polymers capable of being dispersed in water without stirring, a 2-L Pyrex polymerization reactor equipped with a stirrer, a nitrogen gas bubbling tube, a thermostat and a reflux condenser was used in the following polymerization reaction.

The reactor was charged with 580.5 g of ethylacetate, 494.5 g of cyclohexane, 215.0 g of acrylic acid, 1.51 g of pentaerythritol triallyl ether, 6.4 g of an allyl monomer A, and 0.75 g of 2,2'-azobisisobutyronitrile. During mixing the materials, nitrogen gas was blown into the mixture to remove oxygen gas remained in the upper space of the flask and dissolved in the resulting solution. Subsequently, a polymerization reaction was carried out by heating the solution to 70° C. for 2 hours under nitrogen gas atmosphere, followed by maturing the resulting solution at 75° C. for 3 hours. After the polymerization reaction was completed, the slurry formed was heated at 100° C. in a rotary evaporator and subjected to vacuum evaporation to remove the solvent, to thereby obtain carboxylic group-containing polymers in the form of white fine powders.

The self-hydration time, dispersion viscosity, neutralized viscosity and transparency of the carboxylic group-containing polymers obtained above were determined by the following methods, and the results are shown in Table 2.

Example 2

The carboxylic group-containing polymers were prepared according to the same method as described in Example 1 except that 6.0 g of an allyl monomer B was used.

The self-hydration time, dispersion viscosity, neutralized viscosity and transparency of the carboxylic group-containing polymers obtained above were determined by the following methods, and the results are shown in Table 2.

Example 3

The carboxylic group-containing polymers were prepared according to the same method as described in Example 1 except that 5.8 g of an allyl monomer C was used.

The self-hydration time, dispersion viscosity, neutralized viscosity and transparency of the carboxylic group-containing polymers obtained above were determined by the following methods, and the results are shown in Table 2.

Example 4

The carboxylic group-containing polymers were prepared according to the same method as described in Example 1 except that 6.0 g of an allyl monomer D was used.

The self-hydration time, dispersion viscosity, neutralized viscosity and transparency of the carboxylic group-containing polymers obtained above were determined by the following methods, and the results are shown in Table 2.

Example 5

The carboxylic group-containing polymers were prepared according to the same method as described in Example 1 except that 5.5 g of an allyl monomer E was used.

The self-hydration time, dispersion viscosity, neutralized viscosity and transparency of the carboxylic group-containing polymers obtained above were determined by the following methods, and the results are shown in Table 2.

Example 6

The carboxylic group-containing polymers were prepared according to the same method as described in Example 1 except that 4.6 g of an allyl monomer F was used.

The self-hydration time, dispersion viscosity, neutralized viscosity and transparency of the carboxylic group-containing polymers obtained above were determined by the following methods, and the results are shown in Table 2.

Example 7

The carboxylic group-containing polymers were prepared according to the same method as described in Example 1 except that 4.6 g of an allyl monomer G was used.

The self-hydration time, dispersion viscosity, neutralized viscosity and transparency of the carboxylic group-containing polymers obtained above were determined by the following methods, and the results are shown in Table 2.

Example 8

The carboxylic group-containing polymers were prepared according to the same method as described in Example 1 except that 4.6 g of an allyl monomer H was used.

The self-hydration time, dispersion viscosity, neutralized viscosity and transparency of the carboxylic group-containing polymers obtained above were determined by the following methods, and the results are shown in Table 2.

Example 9

The carboxylic group-containing polymers were prepared according to the same method as described in Example 1 except that 4.6 g of an aryl monomer I was used.

The self-hydration time, dispersion viscosity, neutralized viscosity and transparency of the carboxylic group-containing polymers obtained above were determined by the following methods, and the results are shown in Table 2.

Comparative Example 1

The carboxylic group-containing polymers were prepared according to the same method as described in Example 1 except that the allyl monomer was not used.

The self-hydration time, dispersion viscosity, neutralized viscosity and transparency of the carboxylic group-containing polymers obtained above were determined by the following methods, and the results are shown in Table 2.

Comparative Example 2

The carboxylic group-containing polymers were prepared according to the same method as described in Example 1 except that the allyl monomer was not used and 0.024 g of polyoxyethylene caster oil added with 43 moles of ethylene oxide was used.

The self-hydration time, dispersion viscosity, neutralized viscosity and transparency of the carboxylic group-containing polymers obtained above were determined by the following methods, and the results are shown in Table 2.

Comparative Example 3

The carboxylic group-containing polymers were prepared according to the same method as described in Example 1 except that the allyl monomer was not used and 24.0 g of polyoxyethylene caster oil added with 43 moles of ethylene oxide was used.

The self-hydration time, dispersion viscosity, neutralized viscosity and transparency of the carboxylic group-containing polymers obtained above were determined by the following methods, and the results are shown in Table 2.

The properties of the carboxyl group-containing hydro-dispersion polymers according to Examples 1 to 9 and Comparative Examples 1 to 3 were analyzed by the following methods, and the results are shown in Table 2.

Test Example 1

Self-Hydration Time

A 1000-mL beaker was charged with 497.5 g of ion-exchanged water without stirring, and 2.5 g of a carboxylic group-containing polymer was supplied to the beaker through a 20 mesh screen at once. Thereafter, the dissolving state was visually observed, and the time period required for completely wetting the white carboxyl group-containing polymer, swelling, changing into a gray-colored gel, and then, settling down to the bottom was determined. At this time, it was not considered as "self-hydration" when the polymers themselves are not completely hydrolyzed and aggregate each other to form white lumps in the upper part of the ion-exchanged water.

Test Example 2

Dispersion Viscosity 12.5 g of a carboxyl group-containing polymer was dissolved in 487.5 g of ion-exchanged water with stirring, to obtain a 2.5 wt % dispersion solution. The viscosity of the dispersion solution obtained above was measured by using a Brookfield type rotational viscometer LV-DVII+ or RV-DV II+ at 25° C., 12 rpm or 20 rpm. The resulting viscosity is referred to a "dispersion viscosity."

Test Example 3

Neutralized Viscosity

Dispersion solutions containing 0.2 wt %, 0.5 wt % and 1.0 wt % of a carboxylic group-containing polymer, respectively, on the basis of the amount of ion-exchanged water were prepared as follows.

(1) 0.2 wt % dispersion solution: 1.0 g of a carboxyl group-containing polymer was dissolved in 499.0 g of ion-exchanged water.

(2) 0.5 wt % dispersion solution: 2.5 g of a carboxyl group-containing polymer was dissolved in 497.5 g of ion-exchanged water.

(3) 1.0 wt % dispersion solution: 5.0 g of a carboxyl group-containing polymer was dissolved in 495.0 g of ion-exchanged water.

These dispersion solutions were stirred with 18 wt % NaOH aqueous solution by using a S-type blade at 300~400 rpm for 3~6 min, to neutralize at pH 7.0~7.3. Thus obtained neutralized viscous solutions were kept at 25° C. for 30 min, and their viscosity was measured by using a Brookfield type rotational viscometer RV-DV II+ at 25° C., 20 rpm. The resulting viscosity is referred to a "neutralized viscosity."

Test Example 4

Transparency

The transparency was determined as transmittancy of light transmitting through the 0.5 wt % neutralized viscous solution, and measured by using a LICO-300 photometer (DRLANGE) at 420 nm.

TABLE 2

| | Self-hydration time (min) | 2.5 wt % dispersion solution-Dispersion viscosity (cps) | 0.5 wt % neutralized viscous solution-Neutralized viscosity (cps) | Transparency (%) |
|---|---|---|---|---|
| Example 1 | 9.30 | 790 | 46,500 | 91.1 |
| Example 2 | 9.20 | 640 | 51,500 | 89.7 |
| Example 3 | 8.30 | 550 | 52,100 | 88.4 |
| Example 4 | 8.55 | 720 | 56,500 | 93.7 |
| Example 5 | 8.15 | 600 | 62,600 | 91.3 |
| Example 6 | 7.10 | 450 | 59,000 | 90.8 |
| Example 7 | 7.43 | 465 | 59,300 | 90.2 |
| Example 8 | 7.59 | 490 | 61,000 | 89.6 |
| Example 9 | 8.26 | 530 | 59,800 | 88.9 |
| Comparative Example 1 | 140 | 17,035 | 48,000 | 89.1 |
| Comparative Example 2 | 52 | 7,900 | 52,000 | 69.7 |
| Comparative Example 3 | 17 | 1,950 | 71,500 | 76.2 |

As illustrated in Table 2, the carboxylic group-containing polymers of Examples 1~9 according to the present invention showed the following properties: their self-hydration time was within 10 min, the viscosity of a 2.5 wt % dispersion solution was in the range from 400 to 800 cps, the viscosity of a 0.5 wt % neutralized viscous solution was in the range of 45,000 to 65,000 cps, the transparency was 85% or more. These results confirmed that the carboxylic group-containing polymers of Examples 1~9 represent superior properties to those of Comparative Examples 1~3. Particularly, it has been found that since the carboxylic group-containing polymers of the present invention exhibit 2- to 18-fold improved self-hydration time, they can be easily dispersed in an aqueous solution without physical manipulation such as stirring.

INDUSTRIAL APPLICABILITY

Since the carboxylic group-containing polymer of the present invention exhibits excellent solubility in water, it can be dispersed in an aqueous solution without stirring. Further, thus prepared dispersion solution of the polymer has very low viscosity, and thereby, it is possible to simplify a manufacturing process and reduce manufacturing time and cost due to its easy handling. Therefore, the carboxylic group-containing polymer of the present invention having excellent dispersion stability, thickening ability and high transparency to an emulsion and a suspension in an aqueous phase can be effectively used as a thickening agent in various fields.

The invention claimed is:

1. A composition for manufacturing a carboxylic group-containing polymer comprising a vinyl group-containing unsaturated carboxylic acid, a vinyl group-containing crosslinking agent, a radical polymerization initiator, and 0.1 to 10 parts by weight of an allyl monomer represented by Formula 1 on a basis of 100 parts by weight of the vinyl group-containing unsaturated carboxylic acid:

[Formula 1]

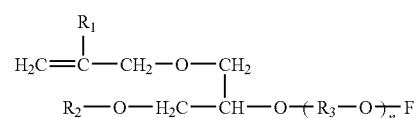

wherein $R_1$ is H or $CH_3$, $R_2$ is $C_{10}$~$C_{30}$ alkyl, $R_3$ is $C_1$~$C_6$ alkylene, F is H, $CH_3$, $SO_3H$, $SO_3Na$ or $SO_3NH_4$, and n is an integer ranging from 10 to 60.

2. The composition according to claim 1, wherein the composition comprises: 1) 100 parts by weight of a vinyl group-containing unsaturated carboxylic acid, 2) 0.1 to 2.0 parts by weight of a vinyl group-containing crosslinking agent, 3) 0.1 to 2.0 parts by weight of a radical polymerization initiator, and 4) 0.1 to 10 parts by weight of an allyl monomer represented by Formula 1.

3. The composition according to claim 1, wherein the unsaturated carboxylic acid is selected from the group consisting of acrylic acid, methacrylic acid, itaconic acid, fumaric acid, crotonic acid, and maleic acid.

4. The composition according to claim 1, wherein the crosslinking agent is one or a mixture of at least two kinds selected from the group consisting of methylene bisacryl amide, pentaerythritol diallyl ether, pentaerythritol triallyl ether, pentaerythritol tetraallyl ether, pentaerythritol diacrylate, pentaerythritol triacrylate, ethylene glycol dimethacrylate, ethylene glycol diglycidylether, tetra vinyl silane, and poly allyl sucrose.

5. The composition according to claim 1, wherein the initiator is one or a mixture of at least two kinds selected from the group consisting of 2,2'-azobisisobutyronitrile, 2-2'-azobis-2-methylbutyronitrile, 2,2'-azobis-4-methoxy-2,4-dimethylvaleronitrile, 2,2'-azobis-2,4-dimethylvaleronitrile, dimethyl 2,2'-azobis-2-methyl propionate, t-butyl peroxide, butylhydro peroxide, cumene peroxide, and benzoyl peroxide.

6. A carboxylic group-containing polymer manufactured by polymerizing the composition defined in claim 1, the composition self-hydration time (at 0.5 weight % of polymer) is within 10 min, viscosity of a dispersion solution (at 2.5 weight % of polymer) is 800 cps or below, viscosity of a neutralized viscous solution (at pH 6.5 to 7.5) is in a range from 30,000 to 100,000 cps, and transparency is 85% or more.

7. A thickener containing the carboxylic group-containing polymer of claim 6.

8. An emulsifier containing the carboxylic group-containing polymer of claim 6.

9. A dispersion stabilizer containing the carboxylic group-containing polymer of claim 6.

* * * * *